United States Patent
Ko et al.

(10) Patent No.: US 11,267,423 B2
(45) Date of Patent: Mar. 8, 2022

(54) DRIVER SEAT AIRBAG

(71) Applicant: Hyundai Mobis Co., Ltd., Seoul (KR)

(72) Inventors: Seok Hoon Ko, Yongin-si (KR); Hae Kwon Park, Yongin-si (KR); Do Hyoung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 28 days.

(21) Appl. No.: 16/845,627

(22) Filed: Apr. 10, 2020

(65) Prior Publication Data

US 2020/0324726 A1   Oct. 15, 2020

(30) Foreign Application Priority Data

Apr. 11, 2019 (KR) ........................ 10-2019-0042298

(51) Int. Cl.
*B60R 21/203* (2006.01)
*B60R 21/215* (2011.01)

(52) U.S. Cl.
CPC ........ *B60R 21/203* (2013.01); *B60R 21/2037* (2013.01); *B60R 21/215* (2013.01); *B60R 2021/21506* (2013.01)

(58) Field of Classification Search
CPC . B60R 21/203; B60R 21/2037; B60R 21/215; B60R 2021/21506
See application file for complete search history.

(56) References Cited

U.S. PATENT DOCUMENTS

| | | | | |
|---|---|---|---|---|
| 5,380,037 | A * | 1/1995 | Worrell ................. | B60Q 5/003 200/61.55 |
| 5,508,481 | A * | 4/1996 | Williams ............... | B60Q 5/003 200/61.54 |
| 5,636,858 | A * | 6/1997 | Niederman ......... | B60R 21/2035 280/728.2 |
| 5,775,725 | A * | 7/1998 | Hodac ................... | B60Q 5/003 280/728.2 |
| 6,082,758 | A * | 7/2000 | Schenck ............... | B60Q 5/003 200/305 |
| 6,474,682 | B2 * | 11/2002 | Ikeda .................... | B60Q 5/003 200/61.55 |
| 6,554,312 | B2 * | 4/2003 | Sakane ................. | B60Q 5/003 280/728.2 |
| 6,565,113 | B2 * | 5/2003 | Kassman .............. | B60R 21/217 280/728.2 |
| 6,688,638 | B2 * | 2/2004 | Schutz .................. | B60Q 5/003 200/61.55 |
| 6,719,324 | B2 * | 4/2004 | Albers .................. | B60Q 5/003 116/59 |

(Continued)

FOREIGN PATENT DOCUMENTS

JP           2013082283 A  *  5/2013   ......... B60R 21/2037

*Primary Examiner* — Laura Freedman
(74) *Attorney, Agent, or Firm* — H.C. Park & Associates, PLC

(57) ABSTRACT

A driver seat airbag including a horn plate seated on a steering wheel armature and provided with a plurality of restraint holes; holders disposed in the plurality of restraint holes; restraint clips installed in the plurality of holders to be elastically deformable; a mounting plate seated on the horn plate; and hooks provided to protrude from the mounting plate to correspond to the plurality of restraint holes, inserted into the plurality of restraint holes, and hooked on and restrained by the restraint clips.

8 Claims, 10 Drawing Sheets

(56) References Cited

U.S. PATENT DOCUMENTS

| | | | | |
|---|---|---|---|---|
| 6,793,237 | B2* | 9/2004 | Derrick | B60R 21/2037 |
| | | | | 24/453 |
| 6,874,808 | B2* | 4/2005 | Marath | B60Q 5/003 |
| | | | | 280/728.2 |
| 7,185,915 | B2* | 3/2007 | Fujita | B60R 21/2037 |
| | | | | 280/731 |
| 7,264,266 | B2* | 9/2007 | Erlingstam | B60R 21/2035 |
| | | | | 280/728.2 |
| 7,566,071 | B2* | 7/2009 | Tsujimoto | B60Q 5/003 |
| | | | | 280/731 |
| 7,789,415 | B2* | 9/2010 | Groleau | B60R 21/2037 |
| | | | | 280/728.2 |
| 8,042,830 | B2* | 10/2011 | Hagelgans | B60R 21/2035 |
| | | | | 280/728.2 |
| 8,500,156 | B2* | 8/2013 | Banno | B60R 21/2037 |
| | | | | 280/728.2 |
| 9,120,453 | B2* | 9/2015 | Obayashi | B62D 7/222 |
| 9,580,034 | B2* | 2/2017 | Saito | B60R 21/21658 |
| 10,023,221 | B2* | 7/2018 | Obayashi | B60Q 5/003 |
| 10,994,684 | B2* | 5/2021 | Ko | B60R 21/203 |
| 2017/0361801 | A1* | 12/2017 | Banno | B60R 21/2037 |

\* cited by examiner

DRIVER SEAT AIRBAG

CROSS-REFERENCE TO RELATED APPLICATION

This application claims priority from and the benefit of Korean Patent Application No. 10-2019-0042298, filed on Apr. 11, 2019, which is hereby incorporated by reference for all purposes as if set forth herein.

BACKGROUND

Field

Exemplary embodiments of the present invention relate to a driver seat airbag, and more particularly, to a driver seat airbag capable of preventing a hook of a horn plate from being deformed by a deploying force thereof.

Discussion of the Background

Generally, vehicles include a plurality of airbags. A driver seat airbag is installed in a steering wheel of the vehicle. The driver seat airbag is packaged in a mounting plate, and a cover is coupled onto an upper side of the mounting plate. The hook is formed in the mounting plate, and a wire is installed in a steering wheel armature of the steering wheel to restrain the hook.

A horn guide is installed in a cover. A horn spring is installed in the horn guide, and a horn rod is installed in the horn spring. A horn contact is installed in the mounting plate to face the horn rod. A positive electrode wire is connected to the horn rod, and thus functions as a positive electrode. Further, the horn contact is grounded at the steering wheel armature, and functions as a negative electrode. If a driver pushes the cover, the cover moves down a bit, and thus the horn rod is electrically connected to the horn contact. As the horn rod is connected to the horn contact, the horn is operated.

However, since the hook is formed in the mounting plate in related art and the wire is installed in the steering wheel armature to restrain the hook, the hook is deformed when the deploying force of the driver seat airbag is applied to the mounting plate, and thus may be released from the restraint of the wire. Therefore, there is a need to solve this problem.

The above information disclosed in this Background section is only for enhancement of understanding of the background of the invention and, therefore, it may contain information that does not constitute prior art.

SUMMARY

Exemplary embodiments of the present invention address the above problem, and various embodiments of the present invention are directed to providing a driver seat airbag capable of preventing a hook of a horn plate from being deformed by a deploying force thereof.

Additional features of the invention will be set forth in the description which follows, and in part will be apparent from the description, or may be learned by practice of the invention.

An exemplary embodiment of the present invention provides a driver seat airbag including: a horn plate seated on a steering wheel armature and provided with a plurality of restraint holes; holders disposed in the plurality of restraint holes; restraint clips installed in the plurality of holders to be elastically deformable; a mounting plate seated on the horn plate; and hooks provided to protrude from the mounting plate to correspond to the plurality of restraint holes, inserted into the plurality of restraint holes, and hooked on and restrained by the restraint clips.

The restraint clip may be elastically deformed such that both ends thereof are narrowed when inserted into the holder and are widened after being inserted into the holder.

The restraint clip may include: a fastening wire that is supported on one side of the holder, and has a fastening protrusion inserted into the holder; a torsion spring that is connected to the fastening wire, and is formed in a ring shape to be elastically deformable; and a restraint that is connected to the torsion spring so as to be moved toward the fastening wire by a pressing force of the hook, and is moved toward a side opposite to the fastening wire to restrain the hook when the hook is inserted into the restraint hole.

The restraint may include: a restraint wire that extends from the torsion spring, and is deformed toward the fastening wire by the pressing force of the hook; and a hook support into which the restraint wire is inserted and on and by which the hook is hooked and restrained.

The restraint may further include an anti-rotation section folded at the restraint wire to prevent rotation of the hook support.

The holder may include: a support that is disposed on one side of the restraint hole such that the fastening wire is supported; guides that extend from the support toward the restraint hole, and have guide holes to enable movement of the restraint when the restraint is deformed; and deformation restrictors that are formed in the guides such that the restraint is restricted to leaning toward the restraint hole.

The hook may further include an anti-deformation rib that supports the hook to prevent the hook from being deformed to the side opposite to the restraint.

The anti-deformation rib may be provided to protrude from the horn plate so as to support the hook.

The anti-deformation rib may be provided to protrude from the steering wheel armature so as to support the hook.

The driver seat airbag may further include a separating member disposed between the horn plate and the mounting plate and configured to apply an elastic force in a direction in which the mounting plate is separated from the horn plate.

According to the inventive concepts, since the hooks are inserted into the restraint holes and hooked on and restrained by the restraint clips, the mounting plate can be easily and rapidly assembled to the horn plate.

Further, according to the inventive concepts, since the restraint and the hook support are biased by the torsion spring, the hook support presses the hook toward one side of the restraint hole by an elastic force of the torsion spring. Thus, even if a deploying force of the driver seat airbag is applied to the mounting plate, the hook can be prevented from being released from the hook support.

Further, according to the inventive concepts, since the anti-deformation rib supports the hook to prevent deformation in the hook, even if a deploying force of the driver seat airbag is applied to the mounting plate, the hook can be prevented from being released from the hook support.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
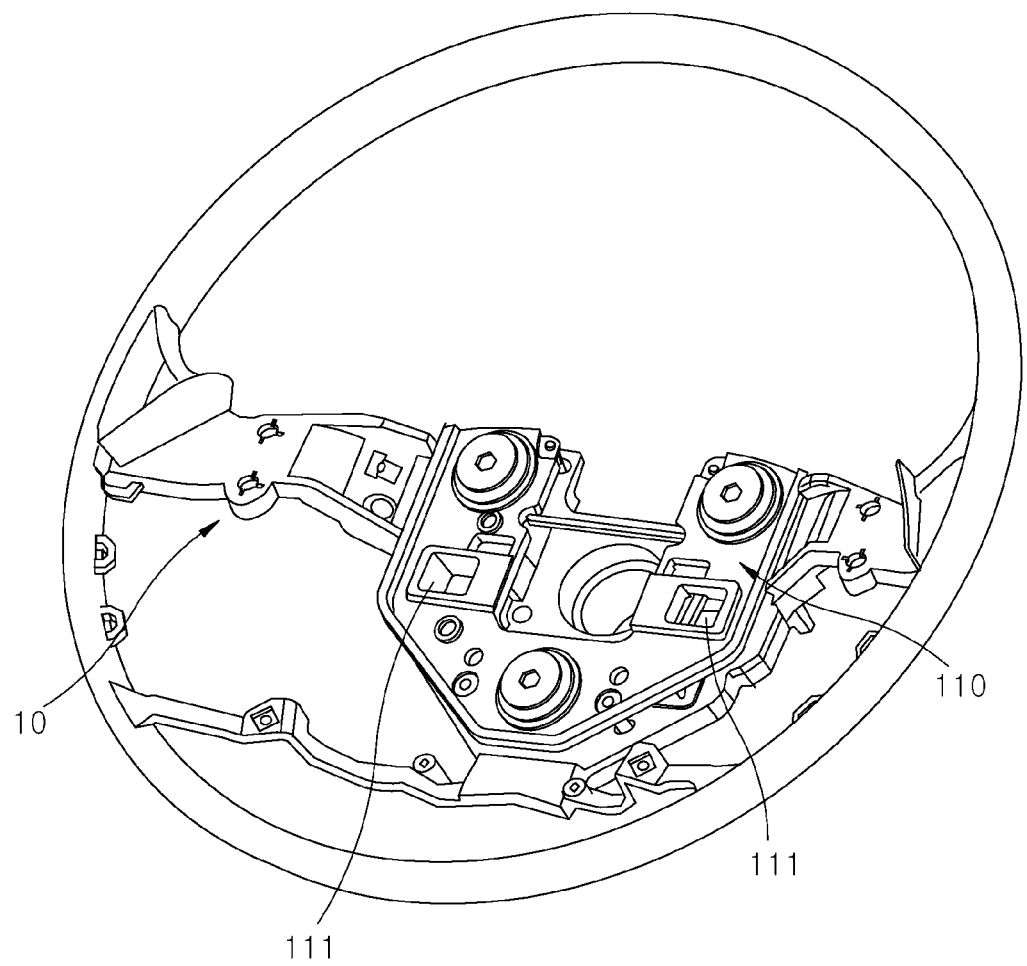
FIG. 1 is a perspective view illustrating a state in which a horn plate is seated on a steering wheel armature in a driver seat airbag according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be Hereinafter, an embodiment of a driver seat airbag according to the present invention will be described with reference to the accompanying drawings. Thicknesses of lines or sizes of components illustrated in the drawings in the process of describing the driver seat airbag may be exaggeratedly illustrated for clarity and convenience of description. Further, terms, as will be mentioned below, are terms defined in consideration of their functions in the present invention, which may be varied according to the intention of a user or an operator or practice. Therefore, the terms should be defined based on the contents of this specification.

Figure 2:
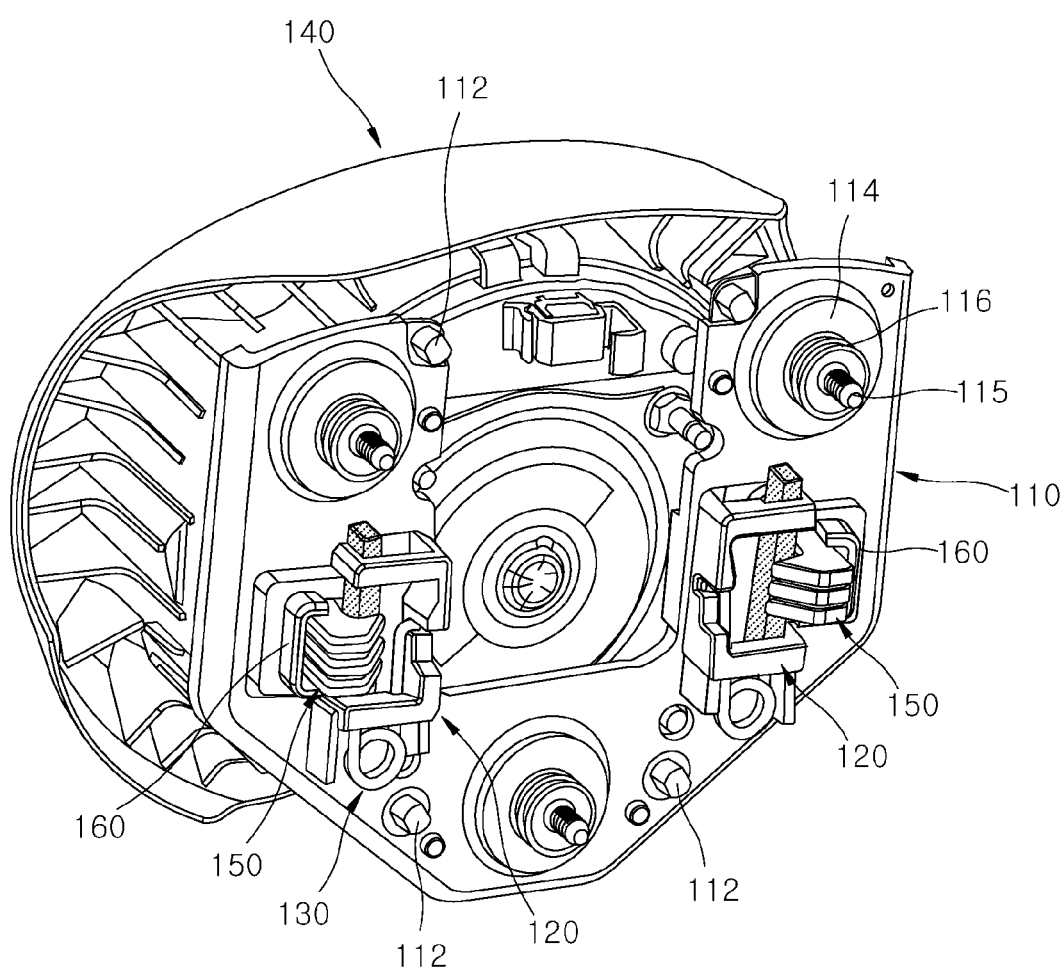
FIG. 2 is a perspective view illustrating a state in which a mounting plate is coupled to the horn plate in the driver seat airbag according to the exemplary embodiment of the present invention.
Figure 3:
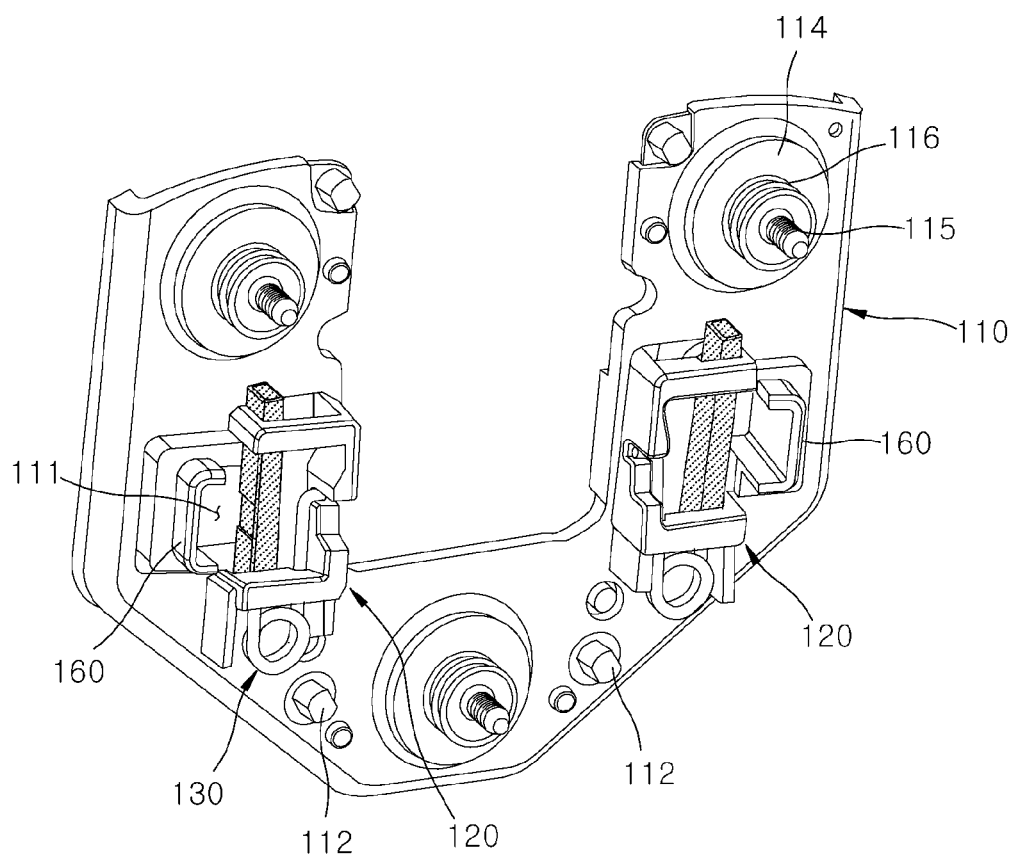
FIG. 3 is a perspective view illustrating a state in which restraint clips are installed on the horn plate in the driver seat airbag according to the exemplary embodiment of the present invention.

FIG. 1 is a perspective view illustrating a state in which a horn plate is seated on a steering wheel armature in a driver seat airbag according to an embodiment of the present invention. FIG. 2 is a perspective view illustrating a state in which a mounting plate is coupled the horn plate in the driver seat airbag according to the embodiment of the present invention. FIG. 3 is a perspective view illustrating a state in which restraint clips are installed on the horn plate in the driver seat airbag according to the embodiment of the present invention.

Referring to FIGS. 1 to 3, a driver seat airbag according to an embodiment of the present invention includes a horn plate 110, holders 120, restraint clips 130, a mounting plate 140, and hooks 150.

The horn plate 110 is seated on a steering wheel armature 10, and a plurality of restraint holes 111 are formed in the horn plate 110. The horn plate 110 is formed in a plate shape having a nearly U shape. The restraint holes 111 may be formed on both sides of the horn plate 110 one by one. The restraint holes 111 are formed in such sizes that the hooks 150 can pass therethrough. The restraint holes 111 may be formed in a quadrilateral shape.

A plurality of fixing plates 114 are installed on the horn plate 110, and fixing bolts 115 are respectively installed on the fixing plates 114 to fix the horn plate 110 to the steering wheel armature 10. The fixing bolts 115 are movably coupled to the fixing plates 114. An elevation height of the horn plate 110 depends on a fixation height of the fixing bolts 115. The fixing bolts 115 are inserted into horn springs 116, and the horn springs 116 apply an elastic force in a direction in which the fixing plates 114 and the horn plate 110 are separated from the steering wheel armature 10.

Electric connectors 112 are formed on the horn plate 110 to face a horn contact (not illustrated) of the steering wheel armature 10. The number of electric connectors 112 installed on the horn plate 110 is four. If the horn plate 110 is pressed by the mounting plate 140, the horn plate 110 is moved downward. In this case, as the electric connectors 112 are electrically connected to the horn contact, a horn device (not illustrated) is operated. Further, if a pressure applied to the horn plate 110 is released, the horn plate 110 is moved upward by restoring forces of the horn springs 116. In this case, since the electric connectors 112 are moved upward along with the horn plate 110 and are separated from the horn contact, the operation of the horn device is stopped.

The holders 120 are disposed in the plurality of restraint holes 111, respectively. The holders 120 may be formed in a quadrilateral frame shape. The holders 120 may be disposed at various positions according to shapes of the hooks 150. For example, in the case where ends of the hooks 150 are formed to protrude toward interiors of the restraint holes 111, the holders 120 may be disposed inside the restraint holes 111. Further, in the case where ends of the hooks 150 are formed to protrude toward exteriors of the restraint holes 111, the holders 120 may be disposed outside the restraint holes 111.

The restraint clips 130 are installed in the plurality of holders 120 to be elastically deformable. The restraint clips 130 are elastically deformed such that both ends thereof are narrowed when inserted into the holders 120 and are widened after being inserted into the holders 120. As the hooks 150 are inserted into the restraint holes 111, the hooks 150 are restrained by the restraint clips 130.

The mounting plate 140 is seated on the horn plate 110, and the driver seat airbag (not illustrated) is installed. The driver seat airbag is folded in various shapes, and can then be fixed inside the mounting plate 140.

The hooks 150 are formed to protrude from the mounting plate 140 to correspond to the plurality of restraint holes 111, respectively. The hooks 150 are inserted into the plurality of restraint holes 111 respectively, and thus are hooked on and restrained by the restraint clips 130. Jaws 152 (see FIG. 8) protruding toward the restraint holes 111 are provided on the hooks 150. Since the hooks 150 are inserted into the restraint holes 111 and are hooked on and restrained by the restraint clips 130, the mounting plate 140 is pressed toward the horn plate 110, and is thus restrained by the horn plate 110. Thus, since the mounting plate 140 can be rapidly and easily assembled to the horn plate 110, an assembly time of a vehicle can be reduced.

Figure 4:
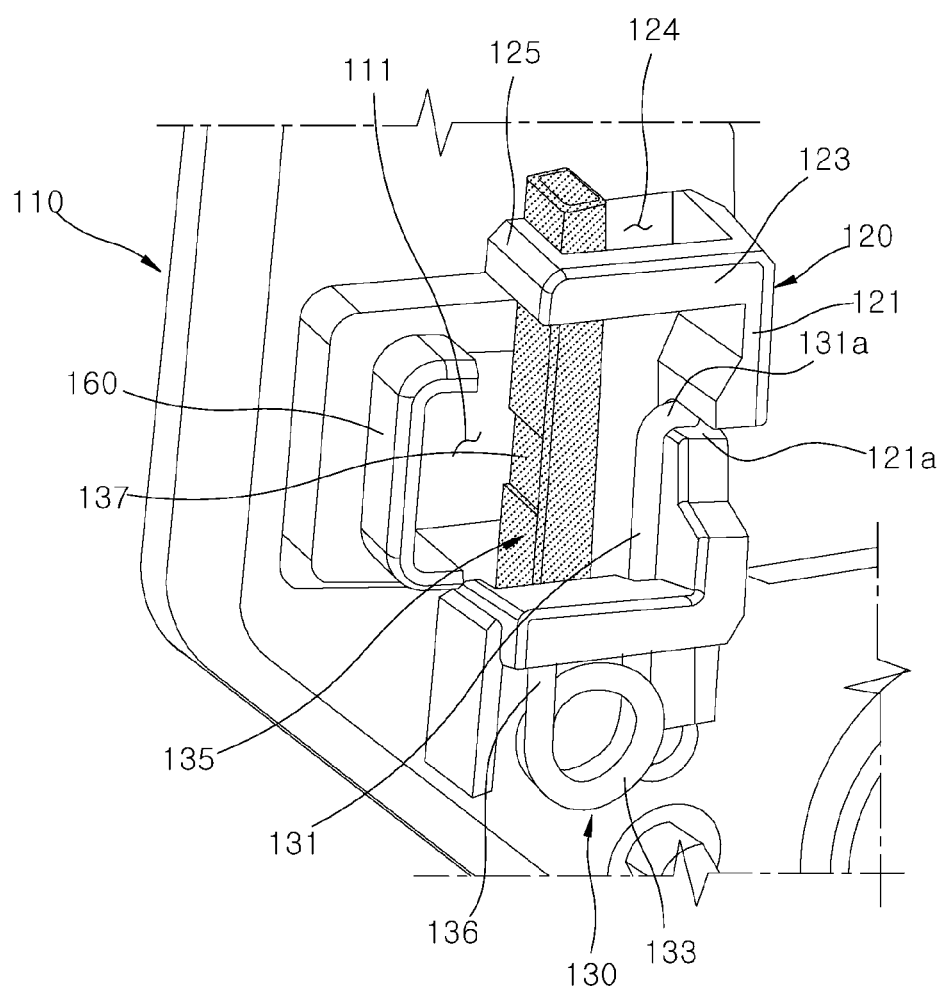
FIG. 4 is an enlarged view illustrating a state in which the restraint clip is inserted into a holder in the horn plate of the driver seat airbag according to the exemplary embodiment of the present invention.
Figure 5:
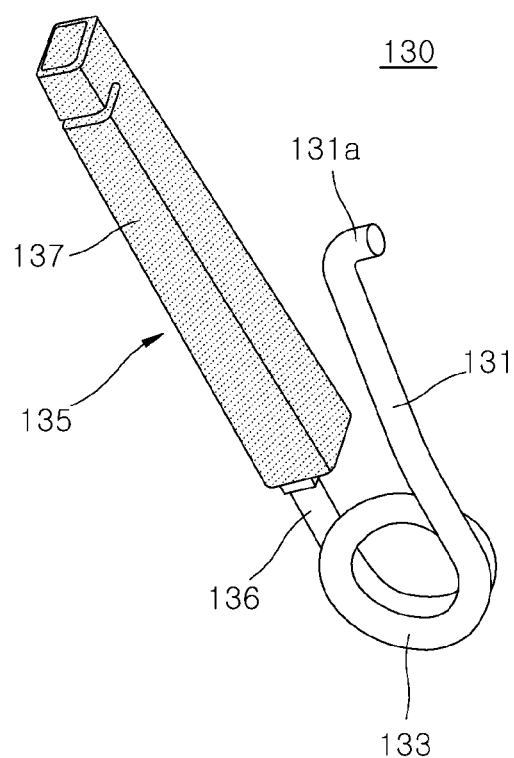
FIG. 5 is a perspective view illustrating the restraint clip in the driver seat airbag according to the exemplary embodiment of the present invention.
Figure 6:
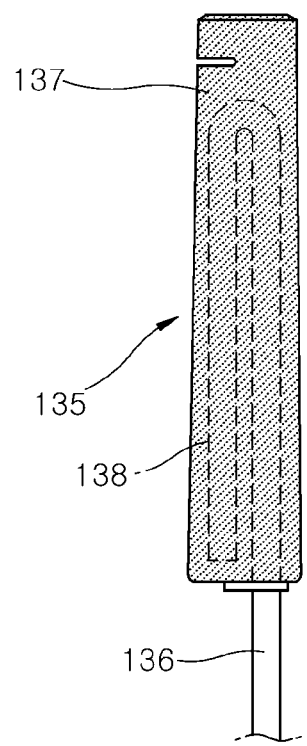
FIG. 6 is an enlarged view illustrating a restraint in the restraint clip of the driver seat airbag according to the exemplary embodiment of the present invention.
Figure 7:
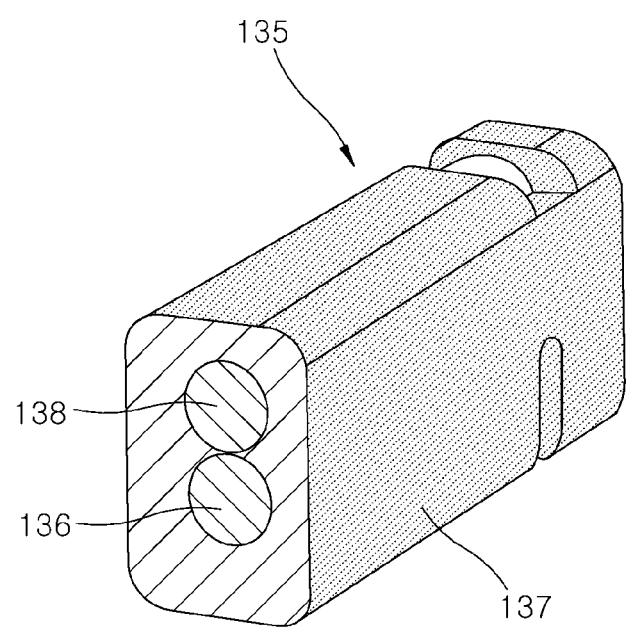
FIG. 7 is a sectional view illustrating the restraint clip in the driver seat airbag according to the exemplary embodiment of the present invention.
Figure 8:
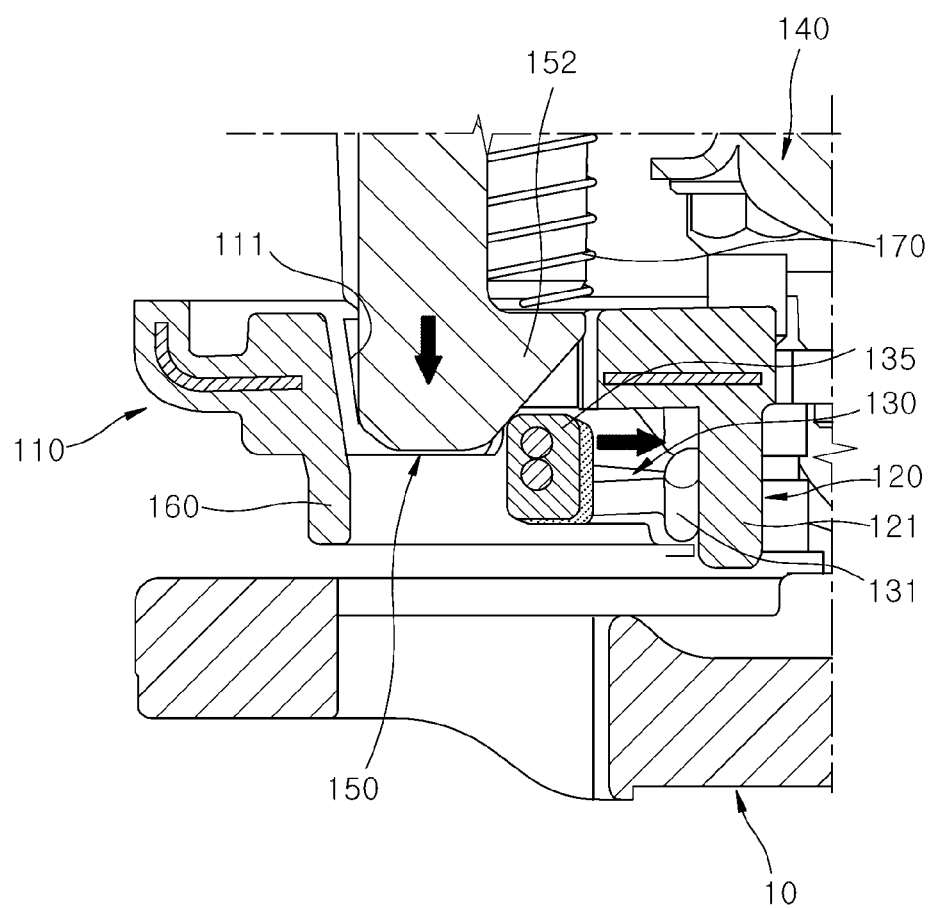
FIG. 8 is a sectional view illustrating a state in which the restraint clip is pressed when a hook is inserted into the restraint hole in the driver seat airbag according to the exemplary embodiment of the present invention.
Figure 9:
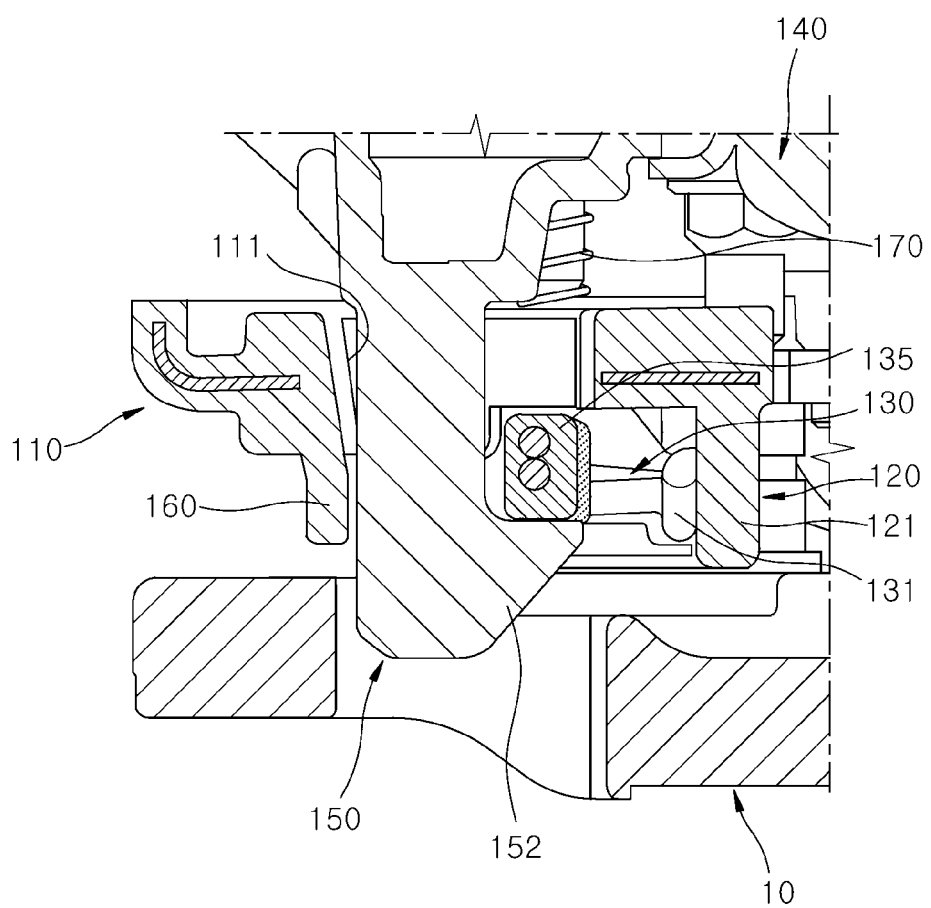
FIG. 9 is a sectional view illustrating a state in which the restraint clip restrains the hook when the hook is inserted into the restraint hole in the driver seat airbag according to the exemplary embodiment of the present invention.
Figure 10:
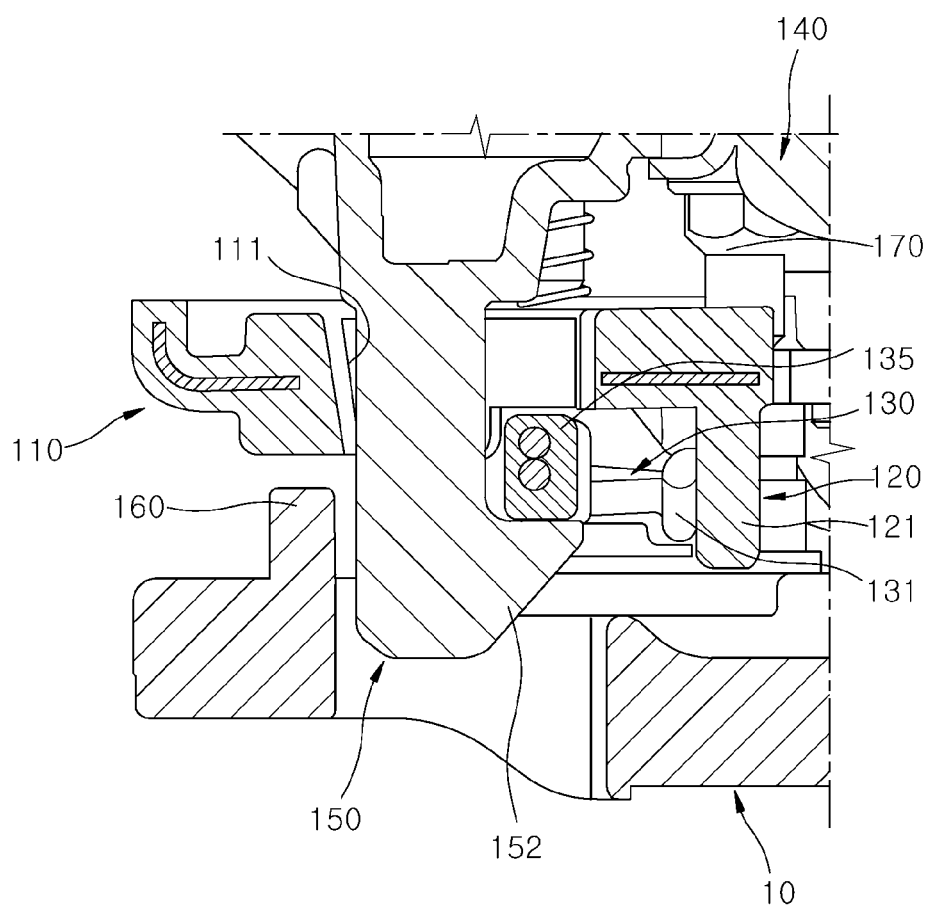
FIG. 10 is a sectional view illustrating another example of an anti-deformation rib in the driver seat airbag according to the exemplary embodiment of the present invention.

FIG. 4 is an enlarged view illustrating a state in which the restraint clip is inserted into the holder in the horn plate of the driver seat airbag according to the embodiment of the present invention. FIG. 5 is a perspective view illustrating the restraint clip in the driver seat airbag according to the embodiment of the present invention. FIG. 6 is an enlarged view illustrating a restraint in the restraint clip of the driver seat airbag according to the embodiment of the present invention. FIG. 7 is a sectional view illustrating the restraint clip in the driver seat airbag according to the embodiment of the present invention. FIG. 8 is a sectional view illustrating a state in which the restraint clip is pressed when the hook is inserted into the restraint hole in the driver seat airbag according to the embodiment of the present invention. FIG. 9 is a sectional view illustrating a state in which the restraint clip restrains the hook when the hook is inserted into the restraint hole in the driver seat airbag according to the embodiment of the present invention. FIG. 10 is a sectional view illustrating another example of an anti-deformation rib in the driver seat airbag according to the embodiment of the present invention.

Referring to FIGS. 4 to 10, each of the restraint clips 130 includes a fastening wire 131, a torsion spring 133, and a restraint 135.

The fastening wire 131 is supported on one side of the holder 120, and is provided with a fastening protrusion 131a to be inserted into the holder 120. The torsion spring 133 is connected to the fastening wire 131, and is formed in a ring shape to be elastically deformable. The restraint 135 is connected to the torsion spring 133 to be moved toward the fastening wire 131 by a pressing force of the hook 150, and is moved away from the fastening wire 131 to restrain the hook 150 when the hook 150 is inserted into the restraint hole 111. The torsion spring 133 applies an elastic force in a direction in which the fastening wire 131 and the restraint 135 are moved away from each other. The fastening protrusion 131a protrudes toward the side away from the restraint 135. An insertion hole 121a is formed in the holder 120 such that the fastening protrusion 131a is inserted thereinto. The fastening protrusion 131a is inserted into the insertion hole 121a, and is restrained not to come out of the holder 120.

The restraint 135 includes a restraint wire 136 and a hook support 137. The restraint wire 136 extends from the torsion spring 133, and is deformed toward the fastening wire 131 by the pressing force of the hook 150. The restraint wire 136 is inserted into the hook support 137, and the hook 150 is hooked on and restrained by the hook support 137. The fastening wire 131, the torsion spring 133, and the restraint wire 136 are formed of a metallic material such as a steel material, and the hook support 137 is formed of a synthetic resin material. The hook support 137 is thicker than the fastening wire 131. The hook support 137 has a quadrilateral cross section, and is in surface contact with the hook 150.

Since the restraint 135 and the hook support 137 are biased by the torsion spring 133, the hook support 137 presses the hook 150 toward one side of the restraint hole 111 by means of an elastic force of the torsion spring 133. Thus, even if the deploying force of the driver seat airbag is applied to the mounting plate 140, the hook 150 can be prevented from being released from the hook support 137. Further, since the hook support 137 has a quadrilateral cross section and the hook support 137 and the hook 150 are formed of a synthetic resin material, a frictional force of the hook 150 and a frictional force of the hook support 137 increase, so that the hook 150 can be prevented from being released from the hook support 137.

The restraint 135 further includes an anti-rotation section 138 folded at the restraint wire 136 to prevent rotation of the hook support 137. The anti-rotation section 138 is disposed parallel to the restraint wire 136. Since the rotation of the hook support 137 is prevented by the restraint wire 136 and the anti-rotation section 138, the hook 150 can be stably restrained by the hook support 137. Thus, the hook 150 can be prevented from being separated or released from the hook support 137.

Each of the holders 120 includes a support 121, guides 123, and deformation restrictors 125.

The support 121 is disposed on one side of the restraint hole 111 such that the fastening wire 131 is supported. The support 121 is disposed to be spaced apart from the restraint hole 111 by a certain distance.

Each of the guides 123 extends from the support 121 toward the restraint hole 111, and has a guide hole 124 such that the restraint 135 is moved at the time of deformation in the guide hole 124. The guide hole 124 is elongatedly formed between a lower surface of the horn plate 110 and each of the guides 123 in a lengthwise direction of each of the guides 123. The guides 123 are formed on opposite sides in a lengthwise direction of the support 121 side by side.

The deformation restrictors 125 are formed at the guides 123 such that the restraint 135 is restricted to leaning toward the restraint hole 111. The deformation restrictors 125 are connected to ends of the guides 123 and the lower surface of the horn plate. The deformation restrictors 125 are disposed on both sides of the restraint hole 111.

The driver seat airbag further includes an anti-deformation rib 160 that supports the hook 150 to prevent the hook 150 from being deformed to the side opposite to the restraint 135. The anti-deformation rib 160 may be formed in an approximate U shape to surround the side opposite to the restraint 135 of the hook 150. The anti-deformation rib 160 is disposed around the restraint hole 111. Since the anti-deformation rib 160 prevents the deformation in the hook 150, even if the deploying force of the driver seat airbag is applied to the mounting plate 140, the hook 150 can be prevented from being released from the restraint 135.

The anti-deformation rib 160 is provided to protrude from the horn plate 110 so as to support the hook 150 (see FIG.

9). The anti-deformation rib 160 is provided to protrude downward from the lower surface of the horn plate 110. In this case, the anti-deformation rib 160 is spaced apart from an upper surface of the steering wheel armature 10 such that the electric connectors 112 can come into contact with the horn contact during downward movement of the horn plate 110.

Further, the anti-deformation rib 160 may be provided to protrude from the steering wheel armature 10 so as to support the hook 150 (see FIG. 10). The anti-deformation rib 160 is provided to protrude upward from the upper surface of the steering wheel armature 10. The anti-deformation rib 160 is spaced apart from the horn plate 110 such that the electric connectors 112 can come into contact with the horn contact during the downward movement of the horn plate 110.

The driver seat airbag further includes a separating member 170 that is disposed between the horn plate 110 and the mounting plate 140 and applies an elastic force in a direction in which the mounting plate 140 is separated from the horn plate 110. A coil spring may be applied as the separating member 170. If a worker presses the restraint clip 130 to release the restraint of the hook 150 in order to disassemble the mounting plate 140, the separating member 170 pushes the mounting plate 140 upward, and the hook 150 easily comes out of the restraint hole 111. Thus, the mounting plate 140 can be easily and rapidly disassembled.

Although exemplary embodiments of the present invention have been disclosed for illustrative purposes, those skilled in the art will appreciate that various modifications, additions and substitutions are possible, without departing from the scope and spirit of the invention as defined in the accompanying claims. Thus, the true technical scope of the invention should be defined by the following claims.

What is claimed is:

1. A driver seat airbag assembly comprising:
   a horn plate seated on a steering wheel armature and including a plurality of restraint holes;
   holders disposed at the plurality of restraint holes;
   elastically deformable restraint clips installed in the holders;
   a mounting plate seated on the horn plate; and
   hooks protruding from the mounting plate to correspond to the plurality of restraint holes, inserted into the plurality of restraint holes, and hooked on and restrained by the restraint clips,
   wherein:
   each restraint clip includes:
      a fastening wire supported on one side of the respective holder, and having a fastening protrusion inserted into the respective holder;
      a torsion spring connected to the fastening wire, and having a ring shape to be elastically deformable; and
      a restraint connected to the torsion spring and configured to be moved toward the fastening wire by a pressing force of the respective hook, and configured to be moved toward a side opposite to the fastening wire to restrain the respective hook when the respective hook is inserted into the respective restraint hole; and
   the restraint includes:
      a deformable restraint wire extending from the torsion spring, and configured to be deformed toward the fastening wire by the pressing force of the respective hook; and
      a hook support into which the restraint wire is inserted, and by which the respective hook is hooked and restrained.

2. The driver seat airbag assembly according to claim 1, wherein each of the restraint clips is elastically deformable such that both ends thereof are narrowed when inserted into the respective holder and are widened after being inserted into the respective holder.

3. The driver seat airbag assembly according to claim 1, wherein the restraint further includes an anti-rotation section folded at the restraint wire to prevent rotation of the hook support.

4. The driver seat airbag assembly according to claim 1, further comprising a separating member disposed between the horn plate and the mounting plate and configured to apply an elastic force in a direction in which the mounting plate is separated from the horn plate.

5. A driver seat airbag assembly comprising:
   a horn plate seated on a steering wheel armature and including a plurality of restraint holes;
   holders disposed at the plurality of restraint holes;
   elastically deformable restraint clips installed in the holders;
   a mounting plate seated on the horn plate; and
   hooks protruding from the mounting plate to correspond to the plurality of restraint holes, inserted into the plurality of restraint holes, and hooked on and restrained by the restraint clips,
   wherein:
   each restraint clip includes:
      a fastening wire supported on one side of the respective holder, and having a fastening protrusion inserted into the respective holder;
      a torsion spring connected to the fastening wire, and having a ring shape to be elastically deformable; and
      a restraint connected to the torsion spring and configured to be moved toward the fastening wire by a pressing force of the respective hook, and configured to be moved toward a side opposite to the fastening wire to restrain the respective hook when the respective hook is inserted into the respective restraint hole; and
   each holder includes:
      a support disposed on one side of the respective restraint hole and configured to support the fastening wire;
      guides extending from the support toward the respective restraint hole, each of the guides including a guide hole to enable movement of the restraint when the restraint is deformed; and
      deformation restrictors formed in the guides such that the restraint is restricted to leaning toward the restraint hole.

6. A driver seat airbag assembly comprising:
   a horn plate seated on a steering wheel armature and including a plurality of restraint holes;
   holders disposed at the plurality of restraint holes;
   elastically deformable restraint clips installed in the holders;
   a mounting plate seated on the horn plate; and
   hooks protruding from the mounting plate to correspond to the plurality of restraint holes, inserted into the plurality of restraint holes, and hooked on and restrained by the restraint clips, wherein:

each restraint clip includes:
- a fastening wire supported on one side of the respective holder, and having a fastening protrusion inserted into the respective holder;
- a torsion spring connected to the fastening wire, and having a ring shape to be elastically deformable; and
- a restraint connected to the torsion spring and configured to be moved toward the fastening wire by a pressing force of the respective hook, and configured to be moved toward a side opposite to the fastening wire to restrain the respective hook when the respective hook is inserted into the respective restraint hole; and
- the driver seat airbag assembly further includes a plurality of anti-deformation ribs, each anti-deformation rib supporting the respective hook to prevent the respective hook from being deformed to the side opposite to the restraint.

7. The driver seat airbag assembly according to claim 6, wherein each anti-deformation rib protrudes from the horn plate so as to support the respective hook.

8. The driver seat airbag assembly according to claim 6, wherein each anti-deformation rib protrudes from the steering wheel armature so as to support the respective hook.

* * * * *